United States Patent [19]

Andreae

[11] 4,008,060
[45] Feb. 15, 1977

[54] GAS FILTER

[76] Inventor: Erhard Charles Andreae, 36, Chemin de Pierrefleur, 1018 Lausanne, Switzerland

[22] Filed: Feb. 9, 1976

[21] Appl. No.: 656,141

[30] Foreign Application Priority Data
Dec. 4, 1975 Switzerland .............. 15783/75

[52] U.S. Cl. ........................ 55/446; 55/486
[51] Int. Cl.² ........................ B01D 45/00
[58] Field of Search .......... 55/440, 442, 445, 446, 55/485-488, 521; 210/335, 315, 336, 337

[56] References Cited
UNITED STATES PATENTS 3,075,337  1/1963  Andreae ............... 55/446
3,744,222  7/1973  Delao ................. 55/446

Primary Examiner—Bernard Nozick
Attorney, Agent, or Firm—Bucknam and Archer

[57] ABSTRACT

An extensible gas filter comprises three perforated walls with parallel folds, interconnected along alternate folds to allow accordion-like folding of the filter to a maximum value corresponding to the developed length of the shortest third wall, the walls defining chambers with staggered perforations forming a gas-deviating baffle.

3 Claims, 5 Drawing Figures

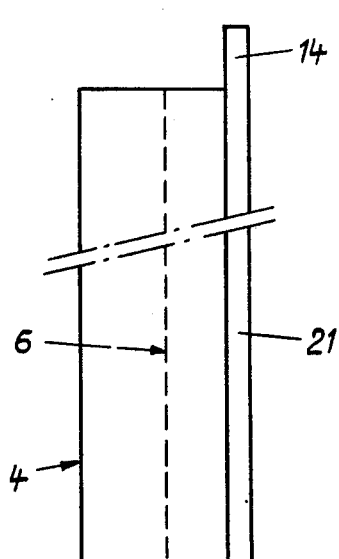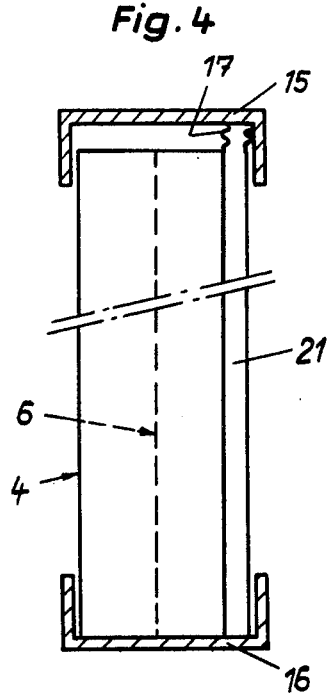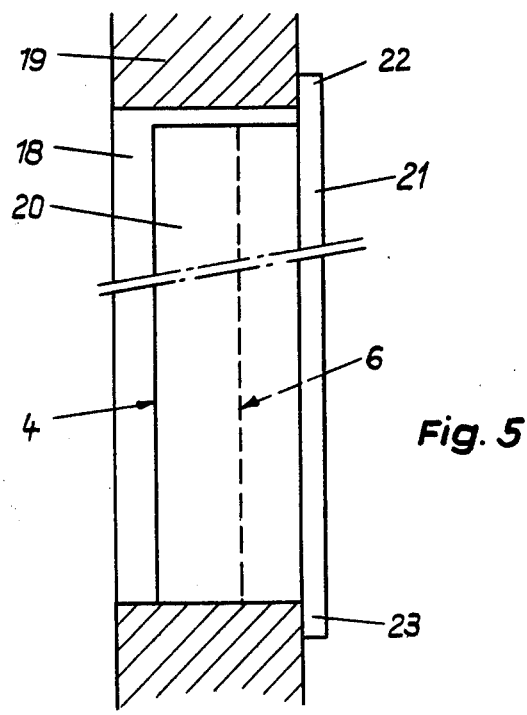

GAS FILTER

The invention relates to extensible gas filters.

A known gas filter described in Swiss Patent No. 359,961 comprises two walls having parallel folds, connected along certain of said folds to define therebetween chambers while allowing extension of the filter in the manner of an accordion. Perforations in each said wall are staggered in relation to those of the other wall for the passage of gas through said chambers along a sinuous path.

The invention concerns a gas filter of this type which is characterized in that it further comprises a perforated third wall having folds parallel to those of the first two walls and being connected to the assembly of the first two walls with its perforations staggered in relation to those of at least one of the first two walls, said third wall having a developed length substantially less than the maximum length to which the assembly of the first two walls alone could be extended and limiting the extension of the filter to said developed length, and hence to an efficient value, less than said maximum.

The accompanying drawings show, by way of example, an embodiment and variations of the gas filter according to the invention. In the drawings:

FIG. 3 is an end view of a variation of the filter;

FIG. 4 is a view similar to FIG. 3, showing fitting of the varied filter in a working position; and FIG. 5 is a view similar to FIG. 4, but showing a second variation.

Figure 1:
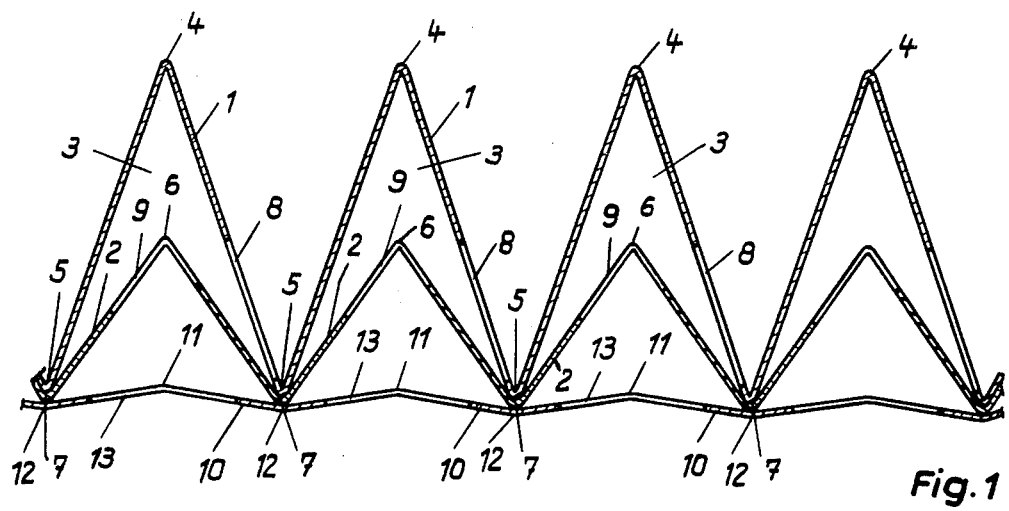
FIG. 1 is a partial view in transverse cross-section of an embodiment of gas filter.
Figure 2:
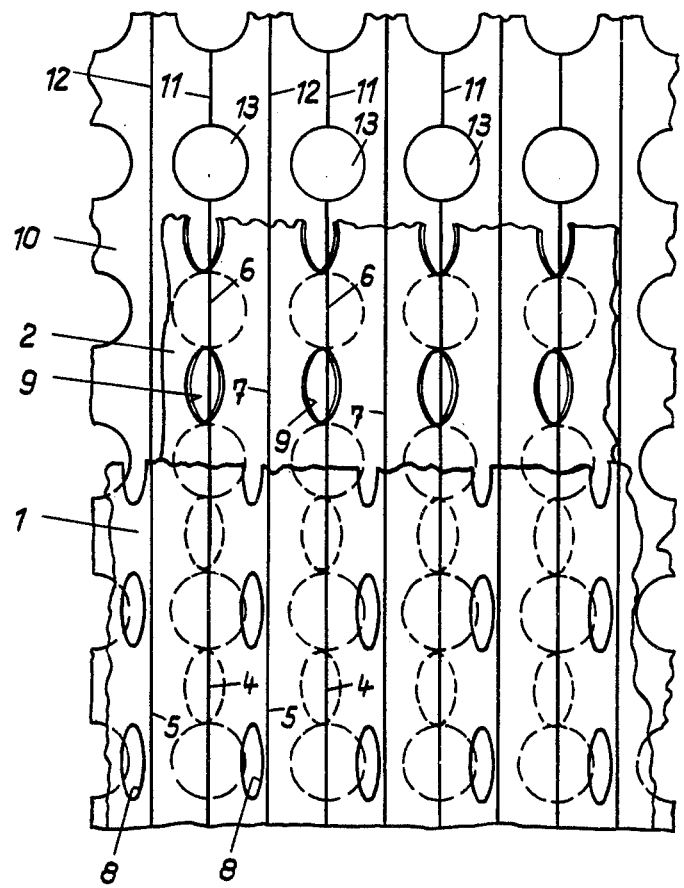
FIG. 2 is a cut-away plan view corresponding to FIG. 1, and to a smaller scale.

The filter shown in FIGS. 1 and 2 comprises two walls 1, 2 forming therebetween chambers 3. These walls have parallel folds 4, 5 for wall 1, and 6, 7 for wall 2. These two walls are connected together, for example by sticking, along alternate folds 5, 7. The assembly formed of walls 1 and 2 is thus extensible in the manner of an accordion. The wall 1 has perforations 8 aligned as shown in FIG. 2, and wall 2 has perforations 9 also aligned as shown on FIG. 2. The perforations 8 and 9 are offset so that air penetrating perforations 9 is obliged to follow a sinuous path in the chambers 3 to reach perforations 8. This corresponds to the known structure cited at the outset.

In addition to these known elements, the filter shown has a third wall 10 having folds 11, 12 parallel to the folds 4–7 of walls 1 and 2. This third wall 10 has perforations 13 aligned as shown on FIG. 2 and offset in relation to the perforations 9 of the adjacent wall 2. This staggering, which was lateral and longitudinal between perforations 8 and 9, is here substantially longitudinal, in the direction of the folds, in relation to perforations 9 and 8. The staggering must simply be such that the air which passed through the baffle formed by the walls 1 and 2 is firstly obliged to follow a sinuous path in the space between walls 2 and 10.

The wall 10 is fixed to the assembly formed by the walls 1 and 2 by its folds 12, fixed to the united folds 7/5. This third wall has, as shown on FIG. 1, a developed length notably less than the maximum to which the walls 1 and 2 could otherwise be extended. The purpose of this arrangement is to ensure that when the filter is put in place and extended, the third wall 10 limits the extension of the filter to an efficient value and notably less than the maximum value to which the walls 1 and 2 could otherwise be extended.

An advantage of the third wall 10 is to ensure regular folding out of the filter and, consequently, a greater efficiency thereof. Moreover, when the filter is placed in the working position, the third wall 10 prevents it being stretched in an excessive manner detrimental to its efficiency, while allowing the user to give to the filter the maximum admissible extension corresponding to the maximum possible extension of this third wall. Moreover, the presence of the third wall 10 increases the efficiency of the filter by making the air pass therein along a more sinuous path than in the case where there are only two walls.

In the variation according to FIGS. 3 and 4, one of the walls of the filter, for example a third wall 21, has a width (measured in the direction of the folds) greater than that of the two other walls. The protruding part of this larger wall 21 is designated on FIG. 3 by 14. When this filter is put in place for operation, by disposing it between two parallel, facing U-shaped sections 15, 16 (FIG. 4), the protruding part is crushed in the upper section 15, as indicated at 17, to form a joint. In another variation, it would be possible to provide two symmetrical projecting parts such as 14, which would provide a joint in the upper section 15 and a similar joint in the lower section 16. This symmetrical construction would avoid the need to take care, when the filter is being put in place, that the projecting part is upwards.

In the variation of FIG. 5, an extensible filter 20 is engaged in a ventilation opening 18 of a wall 19 with its third wall 21 larger than the first two in a manner to protrude upwardly and downwardly as indicated at 22 and 23. These projecting parts are applied against the wall 19 to provide a joint along the edges of the filter.

What is claimed is:

1. A gas filter of the type comprising two walls having parallel folds, connected along certain of said folds to define therebetween chambers while allowing extension of the filter in the manner of an accordion, and perforations in each said wall staggered in relation to those of the other wall for the passage of gas through said chambers along a sinuous path, which further comprises a perforated third wall having folds parallel to those of the first two walls and being connected to the assembly of the first two walls in the regions where the first two walls are connected, with its perforations staggered in relation to those of at least one of the first two walls, said third wall having a developed length substantially less than the maximum length to which the assembly of the first two walls alone could be extended and limiting the extension of the filter to said developed length.

2. A filter according to claim 1, in which all three walls have the same number of folds.

3. A filter according to claim 1, in which one of its walls protrudes from the others along at least one of the edges of the filter perpendicular to the folds.

* * * * *